United States Patent [19]

Ciriacks et al.

[11] Patent Number: 4,865,750
[45] Date of Patent: Sep. 12, 1989

[54] METHODS FOR REDUCING ANIONS IN PROCESS CHEMICALS

[75] Inventors: John A. Ciriacks, Neenah, Wis.; Charles H. Butcher, Monroe, La.

[73] Assignee: Engineered Systems International, Inc., Appleton, Wis.

[21] Appl. No.: 128,089

[22] Filed: Dec. 3, 1987

Related U.S. Application Data

[63] Continuation-in-part of Ser. No. 859,141, May 2, 1986, abandoned.

[51] Int. Cl.$^4$ ............................................... C02F 1/58
[52] U.S. Cl. ................................... 210/757; 210/769; 210/771; 162/30.1
[58] Field of Search ............... 210/757, 769, 719, 721, 210/663, 758, 761, 770, 771, 774; 162/30.1; 110/238

[56] References Cited

U.S. PATENT DOCUMENTS

| | | | |
|---|---|---|---|
| 4,011,129 | 3/1977 | Tomlinson, II | 162/30 K |
| 4,085,688 | 4/1978 | Smith et al. | 210/769 X |
| 4,363,698 | 12/1982 | Nelson et al. | 162/30.1 |
| 4,511,549 | 4/1985 | Diemer et al. | 210/757 X |

FOREIGN PATENT DOCUMENTS

| | | |
|---|---|---|
| 0074278 | 3/1983 | European Pat. Off. . |
| 2226505 | 11/1974 | France . |
| WO01437 | 4/1983 | PCT Int'l Appl. . |
| 715450 | 6/1977 | U.S.S.R. . |

OTHER PUBLICATIONS

Carter et al., "Gas Desulphurisation by the stretford Process and the Development of a Process to Treat Stretford Effluent," Symposium at McMaster Univ., Hamilton, Ontario, Canada, 3/1977.

Primary Examiner—Tom Wyse
Attorney, Agent, or Firm—Reising, Ethington, Barnard, Perry & Milton

[57] ABSTRACT

Process for controlling, or reducing, the level of oxidized anions, usually oxidized sulfur compounds or oxidized nitrogen compounds, in a reaction medium, preferably in a closed loop recirculating system. The process comprises withdrawing a purge stream from the reaction medium and reducing the oxidized anions in a reduction furnace 44 having a char bed 48. The reduced compounds are recovered from the reduction furnace as smelt 50. Where the reduced compounds are useful in the reaction medium from which the purge stream was withdrawn, the reduced compounds are preferably returned to the reaction medium for further use therein.

2 Claims, 1 Drawing Sheet

METHODS FOR REDUCING ANIONS IN PROCESS CHEMICALS

This application is a continuation-in-part of application Ser. No. 859,141, filed May 2, 1986, now abandoned.

BACKGROUND OF THE INVENTION

This invention relates to methods for treatment of process chemicals and gases, and especially those methods which include reductive burning. It relates especially with respect to the reductive burning of chemical compounds containing certain anionic components, especially oxidized sulfur components, including sulfur-nitrogen components. Most especially, this invention pertains to the reductive burning of sulfate ($SO_4^=$), thiosulfate ($S_2O_3^=$), sulfite ($SO_3^=$), and thiocyanate ($SCN^-$).

These chemicals are commonly generated in certain manufacturing processes, such as flue gas scrubbing, the manufacture of TNT, the manufacture of resorcinol, the cleaning of coke oven gas, the pulping of wood for paper, and magnetohydrodynamic (MHD) electric power generation. There have been many attempts, particularly in connection with pulping processes and gas scrubbing processes, to find ways to chemically reduce these anionic components, in order that the process chemicals may be regenerated and reused. On the whole, certain of these processes have been partially successful, but they tend to leave a substantial portion of the anionic component in the unreduced state. These processes have been of such marginal success that it is common industrial practice in some places to dispose of the process chemicals, after certain treatments thereon, either as waste stream effluents to sewage treatment plants, for discharge into waterways, or for landfill. It would be highly desirable to be able to effect substantially complete reduction of these chemicals, with a minimum of polluting effluents, in a standardized process which would be effective for regeneration of starting materials in virtually any of the industries where such reduction is desirable.

The problem is particularly acute with regard to the recovery of chemicals from the scrubbing of hydrogen sulfide from industrial process gases. Of particular interest is the conversion of spent liquors or spent chemicals from scrubbing both hydrogen cyanide and hydrogen sulfide gases, from industrial process gases, to a treated liquor rich in sodium carbonate and sodium sulfide, with a minimum of sodium thiosulfate and sodium sulfate.

A process for recovering sulfur from scrubbing hydrogen sulfide from industrial process gases is well known as the Stretford Process, developed by W. C. Holmes of England. The process is described in various documents throughout the industrial literature. Illustrative of these descriptions is an article appearing in Chemical Engineering Progress magazine, October 1984, pages 40 through 47. Illustrative of another document describing the Stretford Process is the article by Carter, Rogers, and Morris, from the 1977 symposium from McMaster University in Hamilton, Ontario. Other descriptions of the Stretford Process are also believed to be known in the art.

The basic reaction of the Stretford Process includes the conversion of hydrosulfide ($HS^-$) ions in an aqueous alkaline scrubbing solution to elemental sulfur through the use of oxidized vanadium catalyst. The vanadium is reduced in the process from a $+5$ valence to a $+4$ valence. The vanadium is regenerated to the $+5$ valence through the use of an anthraquinone regenerating composition.

In the operation of the Stretford Process, an undesirable side reaction takes place in that a small fraction of the hydrosulfide ions in the scrubbing solution is converted to the thiosulfate form. In the regeneration process, whereby the hydrosulfide is regenerated to sodium carbonate, the thiosulfate remains unaffected, and becomes an unreactive "dead load" in the Stretford Process stream.

The Stretford Process is known to have a maximum capability to carry sodium salt compounds, with a solubility capability of about 23% to 25% sodium salts under typical operating conditions. As the Stretford chemicals are reprocessed and recycled, the amount of non-reactive sodium thiosulfate in the solution gradually increases and the corresponding fractional amount (or concentration) of reactive sodium chemicals in the solution decreases. If the thiosulfate is not removed from the solution on a regular, or periodic, basis, the amount of sodium thiosulfate continues to build as the Stretford chemicals continue to be recycled through the reducing and oxidizing phases of removing elemental sulfur and regenerating sodium carbonate. Increasing circulation rates are then required of the Stretford solution in order to quantitatively provide enough reactive chemical in the scrubbing process to do the job. The limit of physical capability is reached when the concentration of reactive chemicals is so low that the circulating pumps cannot circulate the solution fast enough to provide the needed reactive chemicals.

As is indicated in the various literature articles written about the Stretford Process, substantial efforts have been expended toward the regeneration and recovery of Stretford solutions, and particularly with regard to the reduction of the thiosulfate component, so that the amount of unreactive sodium salts present in the solution does not excessively impede the scrubbing process. For example, U.S. Pat. No. 3,959,452 Espenscheid takes a portion of the spent Stretford liquor, commonly referred to as a purge stream, and treats it with either sulfuric acid or phosphoric acid followed by treatment with calcium hydroxide. While the result is an effective regeneration of the Stretford scrubbing chemicals, there is also included, as part of the result, the generation of substantial amounts of calcium sulfate or calcium phosphate which require landfill disposal. In the 1977 symposium at McMaster University, there was proposed a gas phase reductive burning process which claims a decomposition of approximately 73% of thiosulfate and 75% of sulfate, the sulfate having been produced as a side reaction to the reduction of thiosulfate. In 1979, Smith and Mills, in a chemical engineering symposium entitled Series Number 57, described a gas phase reduction reaction of Stretford chemicals. They indicate that it is "very difficult to decompose sulfate" and cite decomposition rates in the area of 60% to 70% of the sulfate. An April 1981 article in Chemical Engineering Progress also suggests reductive incineration of Stretford chemicals, with 60% to 70% of the sulfate being reduced to sulfide. Finally in European Application No. 0,072,278, by Dow Chemical Company in 1982, there is a suggestion that the Stretford chemicals should be recovered by the absorption of the anthraquinone component (ADA) and the vanadium component.

While these various processes indicate a degree of success in recovering spent reaction chemicals, there remains a substantial portion, particularly of the sulfate, which remains in the oxidized state after the chemicals have been through the recovery process.

It is an object of this invention to provide a method for the recovery of spent Stretford chemicals by a process which includes reductive burning, whereby the method will convert the anionic components, particularly of sulfate, thiosulfate, and thiocyanate, to sulfide and carbonate. It is another object to provide a process which is compatible, in general, with reductive burning of various anionic components, including sulfate, thiosulfate, and thiocyanate, and other anionic components. As part of the invention, it is an object to provide certain compositions of matter which are useful in their own rights and in the disclosed processes.

SUMMARY OF THE INVENTION

It has been found that certain objects of the invention are achieved in a composition of matter which is a dispersion in a liquid medium of a chemical including an anionic component plus a carbonaceous fuel. The chemical is typically an oxysulfur compound such as sulfate, thiosulfate, or sulfite. Another typical anionic component is a sulfur-nitrogen compound such as thiocyanate.

It is particularly important that the carbonaceous fuel be capable of forming a particulate-type char in a reduction furnace. In some embodiments the fuel is totally free of organic carbon, and is particularly free from lignin chemicals.

The composition may include organic carbon and/or lignin, but not as a primary part of the separately defined carbonaceous fuel. For example, the composition may comprise (1) a spent pulping liquor having lignin chemicals therein, which lignin chemicals are particularly organic chemicals, and (2) a carbonaceous fuel which is free from lignin. Typical of such fuels are coal and coke. Other suitable fuels may be of a decomposed vegetable matter also, but of a less aged type, such as peat, which may include some organic carbon fractions. The fuel is preferably particulate in nature, and especially is capable of forming particles of substantially pure carbon in the reduction furnace. Typical of fuels which are particulate, and of substantially pure carbon, is coke. Exemplary of fuels which are capable of forming particles of essentially pure carbon is coal. There are, as is well known, certain volatile components in coal which are evolved under the influences of heat, leaving a useful residue of substantially pure carbon.

Part of the function of the fuel is to burn and generate heat to energize the reduction furnace. It is important, however, that there be provided to the furnace more carbonaceous fuel than is needed to fuel the furnace. The additional fuel, which is in the form of particulate carbon at some point in the reduction operation, is used as the means of reducing the anions in the chemical reduction operation. Typically the reducing carbon from the fuel combines with oxygen, or its equivalent, from the anion in order to effect the reduction of the anion. It is desirable to provide to the reduction furnace at least about 1.5 moles of carbon for each valence unit of desired anion reduction.

It is particularly contemplated that the chemical compound, which forms part of the mixture of chemical compound and carbonaceous fuel, may include vanadium compounds, and in some cases, quinone compounds, particularly anthraquinone compounds and naphthoquinone compounds, most especially anthraquinone disulfonic acid.

The invention further includes a process of reducing the anionic components of the chemical compounds, particularly in a reduction furnace, and especially in a reduction furnace which uses a char bed which serves as a primary location where the chemical reduction reaction takes place. It is preferred that the dispersion mixture have adequate fluidity as it is introduced into the furnace so that it can be sprayed as droplets. The spray is directed toward the char bed. Portions of the spray are volatilized in the process of falling toward the char bed. As the spray is traveling from the point of its introduction into the furnace toward the char bed it forms a char. Portions of the chemical compound, and particularly the anion portion, may react in the gas phase during the fall toward the char bed. The unreacted portions, which are the majority of the chemical mixture, react on the char bed.

It is desirable that the fuel be intimately mixed with the anion-containing compound by the time it arrives on the char bed. The mixing may take place before the mixture is introduced into the furnace, in which case the fuel and chemical compounds are introduced as a single mixture. The mixing may alternatively take place as the chemical compound and the fuel are introduced into the furnace, whereby they may be introduced separately but mixed at or near the point of introduction. Finally the mixing may take place in the gas phase as the components are traveling toward the char bed, or as they arrive on the char bed.

As a result of the mixing of the fuel with the reactive anionic components, and the transpiration of the reaction on the char bed, at least 75%, and preferably at least 90%, of the oxidized sulfur compounds are reduced to the sulfide form. Further at least 75%, preferably at least 80%, most preferably at least 90% of the sulfate is reduced to the sulfide form.

A more complete recovery of chemicals may be made by separating, from the chemical compound, the quinone components, such as anthraquinone disulfonic acid, before the compounds are introduced into the reduction furnace. The ADA can be separated from the compound by contacting the chemical compound with activated carbon. The ADA may then be recovered from the activated carbon and recycled for further use. The balance of the purge stream, then, is subjected to the reduction furnace process as indicated above.

BRIEF DESCRIPTION OF THE DRAWING

The DRAWING is a schematic, according to the invention, of a Stretford system of the invention, including a purge loop having a reductive burning portion for regenerating a laden Stretford liquor stream by means of reductive burning in a reduction furnace, followed by further treatment of the resulting smelt.

DETAILED DESCRIPTION OF THE INVENTION

Figure 1:
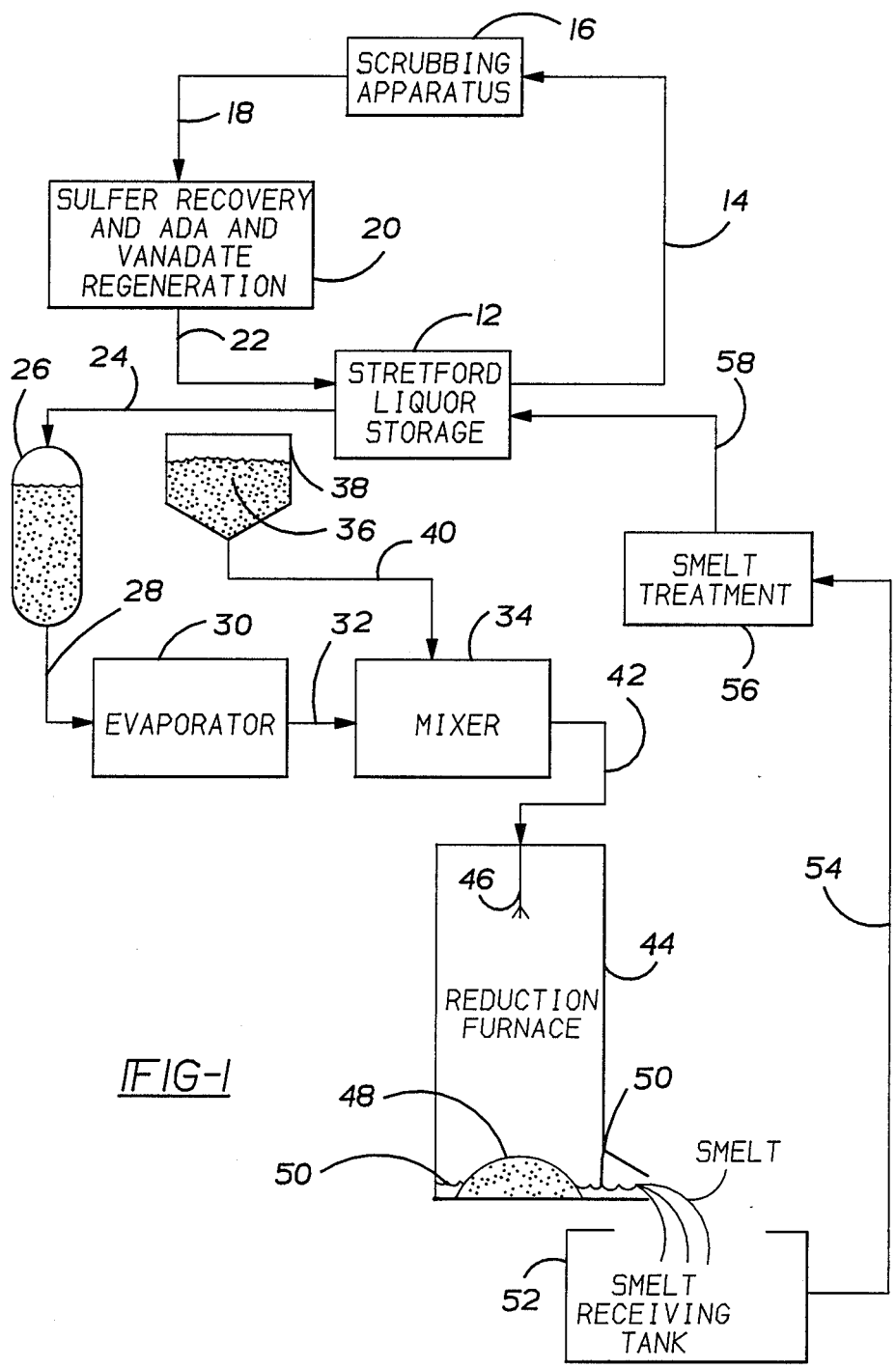

The detailed description of the invention herein is discussed in terms of its application for use in regenerating spent oxidized sulfur chemicals in a purge stream taken from a Stretford liquor. It will be seen hereinafter that the same process can be used to reduce anions, and to generally regenerate spent chemicals, in a variety of chemical reaction process systems.

The invention herein pertains specifically to the recovery of chemicals for reuse as in a process for scrubbing industrial process gases.

In preferred applications of this invention, the process generally comprises two more-or-less distinct processing loops. In the first loop, Stretford process liquor is drawn from the main liquor storage reservoir 12, and passed through line 14 to scrubbing apparatus 16 where it scrubs the process gas. The laden liquor is then passed through line 18 to the sulfur recovery and ADA and vanadate regeneration unit 20, where elemental sulfur is recovered, and the vanadium-containing chemicals are regenerated. The thus treated liquor is passed through line 22 to the main liquor storage reservoir 12. As the result of a side reaction to the recovery of elemental sulfur in recovery and regeneration unit 20, the liquor returned through line 22 to reservoir 12 contains an amount of oxidized sulfur compounds, especially sodium thiosulfate, which are generally non-reactive within the first loop described above, the first loop beginning with withdrawal of liquor through line 14 and ending with returning of the liquor through line 22.

The operation of the first loop is continuous, whereby the process liquor is continuously withdrawn from reservoir 12, passed through the process loop and returned to reservoir 12. This continuous process of reusing the process chemicals results in a continuous input of the oxidized sulfur compounds into the liquor, whereby the oxidized sulfur compound content of the liquor gradually increases.

In the second loop, liquor is drawn from the main liquor storage reservoir 12 and passed through line 24 to a bed of activated carbon 26 for removal, and recovery, of quinone derivatives. The liquor then passes through line 28 to an evaporator 30 for evaporation of water, and thus to raise the solids concentration of the liquor. The concentrated liquor is then passed through line 32 to mixer 34 and mixed with a carbonaceous fuel 36, fed from a supply hopper 38 through line 40 to mixer 34 to obtain a dispersion of the fuel in the concentrated liquor. The mixture is passed through line 42 and introduced into the furnace 44 as by a spray nozzle 46 which sprays the mixture toward the bottom of the furnace. The spray mixture travels downwardly toward the bottom of the furnace and lands on char bed 48. A portion of the carbonaceous fuel is used to produce the furnace heat. An excess of carbon is available, by virtue of the amount of fuel used, to serve as a reducing agent effecting the reduction reaction. Some of the mixture may be reduced in the gas phase while the spray is traveling between the nozzle and the char bed. But a significant portion of the reducible material is believed to be reduced on the char bed, even though applicants choose to not be bound by any particular theory. At any rate, the products of the reaction form a liquid smelt which flows off the char bed 48, collects in a pool 50 at the base of the furnace, and flows into smelt receiving tank 52 where the smelt is generally dissolved in water. The exhaust gases from the furnace are exhausted and passed through various exhaust gas scrubbers before going to the exhaust stacks. The dissolved smelt is then passed through line 54 to a smelt treatment 56 which further treats the smelt and returns it through line 58 to main liquor storage reservoir 12, thus completing the second loop.

This invention is applicable for a variety of reductive reactions. Its best mode is believed to be in the regeneration of process chemicals, particularly as it applies to reduction of sulfate to sulfide, in regeneration of the process chemicals used in the Stretford process for recovering sulfur from hydrogen sulfide scrubbed from industrial process gases.

In the Stretford process illustraed by the first loop, hydrogen sulfide ($H_2S$) is absorbed by sodium carbonate in the Stretford solution according to reaction (1), $$H_2S + Na_2CO_3 \rightarrow NaHS + NaHCO_3 \qquad (1)$$

Any sodium sulfide ($Na_2S$) present is also reactive with $H_2S$, as in reaction (2), $$H_2S + Na_2S \rightarrow 2NaHS \qquad (2)$$

Sodium vanadate ($NaVO_3$) in the Stretford solution oxidizes the NaHS to form a dispersion of small sulfur particles, as in reaction (3), $$2NaHS + 4NaVO_3 + H_2O \rightarrow 2S + Na_2V_4O_9 + 4NaOH \qquad (3)$$

and to regenerate sodium carbonate as in reaction (4), $$NaOH + NaHCO_3 \rightarrow Na_2CO_3 + H_2O. \qquad (4)$$

The sulfur particles may be removed from the Stretford solution by filtration in recovery and regeneration unit 20. $Na_2V_4O_9$ is regenerated back to $NaVO_3$ by an oxidation-reduction reaction with anthraquinone disulfonic acid (ADA) and with oxygen in the air, also all in recovery and regeneration unit 20.

A small fraction of the sulfur initially absorbed as NaHS in reactions (1) and (2) reacts with oxygen to form sodium thiosulfate as in reaction (5).

$$2NaHS + 2O_2 \rightarrow Na_2S_2O_3 + H_2O \qquad (5)$$

The presence of the thiosulfate in the Stretford solution is the fundamental problem which has been addressed, either directly or indirectly, by many in the art. Thiosulfate does not interfere with the chemical reactions that scrub $H_2S$ from industrial process gases. However, as the sodium thiosulfate concentration increases in the $H_2S$ scrubbing solution being circulated through the first loop, a solubility limit for dissolved sodium salts, including the desired NaHS and $Na_2S$, is reached at about 300 grams of solids per liter of solution. The result is an increasing dead load of unreactive sodium thiosulfate in the solution, with corresponding decreasing capability to solvate reactive sodium scrubbing chemicals which react with $H_2S$, in the primary scrubbing process. Eventually, the Stretford solution becomes saturated to the point where it is no longer capable of economically performing the scrubbing process. Such a saturated solution may be either discarded to sewage treatment or may be regenerated by treatment for chemical reduction of its unreactive sodium salt content. Typical regeneration treatment includes the continuing drawing off of a portion of the Stretford solution from its main storage reservoir as a purge stream and chemically treating the chemical composition in the purge stream to thereby reduce the oxidized sulfur compounds, namely the thiosulfates and sulfates to sulfides, and thus to generate a chemical stream which is again useful for scrubbing industrial process gases. Typically, the purge stream, with its reduced chemicals, is returned to the main storage reservoir, thereby providing, by means of the second loop, a continuous purging and regeneration of the chemical composition used in the Stretford scrubbing system of the first loop. Typical conventional purge streams have the following solids compositions by weight, and are free from lignin components:

|  | WITHOUT PURGE REGENERATION | CONVENTIONAL PURGE REGENERATION |
| --- | --- | --- |
| $Na_2CO_3 + NaHCO_3$ | 6.0% | 6.0% |
| $NaVO_3$ | 0.6% | 0.6% |
| ADA | 0.2% | 0.2% |
| $Na_2S_2O_3$ | 80.0% | 30.0% |
| $Na_2SO_4$ | 5.0% | 55.0% |
| $Na_2S$ | 8.2% | 8.2% |
|  | 100% | 100% |

While the composition of the purge stream may vary from time to time, and from process to process, it is common in the conventional art for relatively large fractions of the dissolved purge stream solids to be sodium sulfate and sodium thiosulfate, which are both unreactive sodium salts within the context of the first loop Stretford scrubbing process. It is important that the fraction of these two components be controlled within the Stretford process in order for the process to proceed without poisoning the Stretford scrubbing liquor to the extent that further absorption of hydrogen sulfide is unacceptably impeded.

In a typical process, a portion of the Stretford liquor is withdrawn from the main reservoir as a purge stream, is treated for reduction of the thiosulfate content and the sulfate content to the sulfide form, and is then returned to the main reservoir as a useful scrubbing chemical. In the first step of the general process of the invention the waste liquor is purged from the main reservoir 12. The purge stream, as withdrawn from the process, typically has a solids content of approximately 25%. The purge stream may optionally be passed through activated carbon as at 26 to recover the ADA. In any event, the purge stream is concentrated by evaporating water, typically in direct contact evaporators as at 30, to raise the solids content into the region of 40% to 60% solids. The higher solids content is preferred; the limitation being that solids content which will still allow for sufficient fluidity in the dispersion to satisfy the needs of the balance of the process. The concentrated purge stream liquor is then mixed with a carbonaceous fuel such as coal or coke. In order to efficiently support the reduction reaction it is important that the reducing carbon reactant be finely divided and appropriately mixed with the concentrated Stretford liquor. Thus the mixing should desirably, but not necessarily, produce a uniform mix. The mixture of concentrated liquor and the fuel is sprayed into the reduction furnace. The spray is preferably in the form of coarse droplets, such that the droplets are of sufficient size that they are urged by gravity to drop to the bottom of the furnace through the upward flow of gas currents. As the droplets of the mixture travel downwardly, the heat of the furnace vaporizes the water in the mixture, and by the time the droplets reach the char bed at the bottom of the furnace, no substantial amount of water remains in the mixture. Rather, the mixture, including the thiosulfate and sulfate components, is more in the form of a char. Any volatile matter from the fuel will have been driven off by the time the mixture reaches the char bed. Some of the carbon may have burned in the gaseous phase before reaching the char bed. Additional carbon burns on the char bed, generating the furnace heat.

Sodium thiosulfate is not stable at high temperatures such as are found in the furnace. When water is present, thiosulfate starts decomposing as shown in reaction (6). In the presence of sodium carbonate, when water is not reactively present, the decomposition may proceed as shown in reaction (7). In the absence of sodium carbonate, or water, thermal decomposition proceeds as shown in reaction (8).

$$Na_2S_2O_3 + H_2O \longrightarrow Na_2SO_4 + H_2S \qquad (6)$$

$$Na_2S_2O_3 + Na_2CO_3 \longrightarrow Na_2SO_4 + Na_2S + CO_2 \qquad (7)$$

$$4Na_2S_2O_3 \longrightarrow 3Na_2SO_4 + Na_2S + 4S \qquad (8)$$

It is seen from reactions (6), (7) and (8) that, along with the desirable reduced compounds of $Na_2S$ and S, the thiosulfate decomposition reaction produces the undesirable compound sodium sulfate ($Na_2SO_4$).

According to reaction (7), about 50 mole percent of the sulfur is converted to the undesirable sulfate form, while 50 mole percent is converted to the useful $Na_2S$. To the extent reaction (8) proceeds, about 38 mole percent of the sulfur is converted to the undesirable sulfate form and about 62 mole percent is converted to the useful forms of $Na_2S$ and elemental sulfur. Thus the existence of sulfate in the Stretford liquor actually occurs primarily as a product of the reduction process of regenerating the spent liquor from thiosulfate to sulfide, as seen in reactions (6), (7) and (8). The amount of sulfate generated in the gas scrubbing process is typically rather small.

As shown in the literature, it has previously been difficult to convert $Na_2SO_4$ to $Na_2S$. In the instant invention, this conversion can be done with efficiencies greater than 90%. In order for this conversion to proceed with this high efficiency in the process of the invention, it is critical that the reduction furnace have a char bed on which the reactants react. A significant fraction of the reduction reaction taking place in the reduction furnace takes place on the char bed. There, the carbon char particles are in intimate contact with the $Na_2SO_4$ molecules at a temperature of about 900° C. to 950° C., and the reduction reaction, whereby sulfate is reduced to sulfide, proceeds according to reaction (9)

$$3Na_2SO_4 + 8C \rightarrow 3Na_2S + 4CO + 4CO_2 \qquad (9)$$

The $Na_2S$ (melting point 1180° C.) forms a smelt with sodium carbonate (melting point 851° C.). The smelt flows from the bottom of the reduction furnace, is dissolved, and is further treated according to smelt treatment processes, represented in DRAWING as 56, before being returned to the main reservoir 12. The smelt treatment processes are directed generally at clarifying and purifying the smelt, such processes being well known in the art.

The treated liquor from the process of the invention may be used in both $H_2S$ scrubbers and HCN scrubbers. The chemical requirements for these two scrubbing liquors are similar. For HCN absorption, $Na_2CO_3$ is desired (reaction 11). However, some $Na_2S$ is needed as shown in reactions (10) and (11).

$$Na_2S + nS \rightarrow Na_2S(n+1) \tag{10}$$

$$Na_2S(n+1) + Na_2CO_3 + HCN \rightarrow NaSCN + NaHCO_3 + Na_2S_n \tag{11}$$

For $H_2S$ absorption, $Na_2CO_3$ is desirable as indicated by reaction (1). $Na_2S$ also reacts with $H_2S$ as indicated by reaction (2).

In some cases the spent liquor includes the chemical products from scrubbing hydrogen cyanide (HCN), such as from a coke oven gas. Product formed from scrubbing hydrogen cyanide is usually in the form of sodium thiocyanate (NaSCN). The NaSCN is decomposed in the recovery furnace according to a series of reactions (12), (13), and (14).

$$NaSCN + CO_2 + H_2O \rightarrow HCN + NaHCO_3 + S \tag{12}$$

$$2NaSCN + 4H_2O \rightarrow N_2 + 2H_2S + 2H_2 + CO + Na_2CO_3 \tag{13}$$

$$NaSCN + 3H_2O \rightarrow COS + CO_2 + 3H_2 + N_2 + Na_2S \tag{14}$$

Reactions (12), (13) and (14) represent several routes by which decomposition of sodium thiocyanate may occur. As the droplets of the mixture travel from the spray nozzle near the top of the furnace toward the char bed, reaction (12) may occur to some extent. As the unreacted NaSCN is heated further (NaSCN melts at 287° C.), decomposition continues. One reaction which may occur is set forth as reaction (13). Analytical tests indicate that the reaction taking place at 850° C. to 950° C. is primarily reaction (14). In addition to the carbonyl sulfide (COS) and $Na_2S$, there may also be formation of some $Na_2CO_3$ (reaction 13). In addition some HCN gas may be produced in small amounts via reaction (12) or a similar reaction. This HCN in the reduction furnace exhaust gas along with the $H_2S$ and any $SO_2$ is removed in the exhaust gas scrubber before releasing the exhaust gas to the atmosphere. The COS from reaction (14) is oxidized by the secondary air in the reduction furnace according to reaction (15)

$$2COS + 3O_2 \rightarrow 2CO_2 + 2SO_2 \tag{15}$$

The carbonaceous fuel is preferably coal or coke having a nominal size of $-200$ mesh, this size being desirable in order to facilitate the mixing, and the subsequent capability to be sprayed through a nozzle and form droplets where the mixture is more or less uniform within a given droplet. In the preferred embodiment the fuel feed stream is fed into a wetting device where it is wet with previously mixed slurry and then is carried by the slurry into a strongly agitated slurry storage tank. The mixed slurry is pumped through the nozzles and past the nozzles of the furnace, with an excess of material being circulated back to the tank with flow rate high enough to prevent solid-liquid separation.

REDUCTION FURNACE OPERATION

During normal operation, the mixture stream is introduced into the furnace through pressure atomizing nozzles. As the droplets fall through the rising hot gases, the water in the mixture evaporates. When coal, or peat are used, volatile matter in the fuel is also evolved as the droplets are falling through the furnace, to the bottom of the furnace. As a result the fuel will have undergone some charring by the time it has reached the char bed.

Essentially dry particles arrive on the char bed, which is at a temperature of about 950° C. It is on the char bed that the most significant amounts of reduction to sulfide take place. The reduced salts are melted and seep out of the bed. Heat for the reduction reaction, and for the drying of the falling spray, comes from oxidation of some of the carbon in the furnace. The carbon being used in the generation of heat and in the reduction of the oxidized salts is replaced by the carbon arriving in the spray particles. There is essentially a constant material balance, then, between the carbon which is being provided with the spray particles and the carbon which is being used, primarily on the char bed, in the production of heat and as a reducing agent to produce the reduced chemicals.

The oxidation of carbon to generate heat for the furnace is provided using a controlled inlet of primary air near the char bed, and provided through a series of air ports. The ports may be adjusted to maintain an even bed temperature. Secondary air may be supplied through additional ports about the glowing bed if the combustion of part of the reduced gases generated by the glowing bed is desired.

The overall result of the process of the invention is three fold:

(1) The desirable chemicals sodium sulfide ($Na_2S$), sodium carbonate ($Na_2CO_3$), and sodium bicarbonate ($NaHCO_3$) are regenerated and available for recycling and usage in Stretford scrubbing liquor.

(2) The exhaust gases from this unit pass to existing scrubbing and reaction facilities for recovery of sulfur compounds, so that the final effluent gas is mainly nitrogen and carbon dioxide with some water.

(3) Waste from the overall Stretford flue gas scrubbing process is essentially limited to insoluble solid components of coal or coke ash, and the liquid water used to wash or remove the ash from a filter cake which is collected in the treatment of the recycled reduction furnace product, subsequent to the smelt production.

Using the process as disclosed, with the char bed as a significant reaction site in the furnace, over 75%, usually over 80%, and especially over 90%, of the sulfate may be reduced in the reduction furnace. For example, by operating the Stretford System with a purge stream being fed to the reduction operation of the invention, the sulfate content, expressed as combined weight percent of the sulfate and thiosulfate compounds in the Stretford liquor, may be maintained at a level of 40% or less, usually 30% or less, typically 20% or less, and sometimes as low as 10%, compared with approximately 50%-60% sulfate in the conventional art. And the purge stream flow rate using conventional art is more than twice that with this invention.

The real value of this invention is in its ability to reduce sodium sulfate with a high degree of efficiency, in that it is able to efficiently convert over 75%, and up to over 90%, of the sulfate to the reduced state, whether the sulfate is in the stream fed into the reduction furnace, or is produced in the reduction process. Especially, the sulfate content of the Stretford liquor may be controlled, and prevented from rising above that tolerable in the process, for an extended period of time.

Table 1 shows typical compositions, in grams per liter of liquor, of a recovery process of the invention and a gas phase reduction burning process of the conventional art for reducing a Stretford purge stream.

TABLE 1

| Chemical | Purge Liquor | | Treated Liquor | |
|---|---|---|---|---|
| | Conventional | This Invention | Conventional | This Invention |
| $Na_2S_2O_3$ | 90 | 185 | 0 | 0 |
| $Na_2SO_4$ | 160 | 65 | 110 | 20 |
| $Na_2CO_3$ | 20 | 20 | 140 | 230 |

Table 1 illustrates the dramatic reduction in steady state sulfate content of a Stretford liquor stream when using the process of the invention, thus relieving the Stretford liquor of its load or unreactive oxidized sulfur salts. And while the oxidized sulfur regeneration process of the invention can provide for indefinite regeneration of sulfide in the Stretford liquor, operating practice has shown that, when using conventional regeneration, the Stretford liquors must be periodically replaced, as the efficiency of the sulfide regeneration decreases with the continued use of a particular charge of Stretford liquor, including make-up solutions, because of accumulating sodium sulfate which is not regenerated by the conventional regeneration process.

The Stretford process is one of several processes which generate undesirable sulfate compounds. It is realistic to anticipate that these other waste streams might be benefitted by using the invention disclosed herein for treatment of the waste streams. In one known process, the liquor from scrubbing hydrogen cyanide is combined with the purge stream of the Stretford liquor, from scrubbing hydrogen sulfide, for reductive of the liquors together in the reduction burning process. The combined liquor, using the process of the invention, has a typical mass balance as shown in Table 2. Comparative mass balance is also shown for treating the combined liquor with a conventional reduction process.

TABLE 2

| Chemical | Purge Liquor | | Treated Liquor | |
|---|---|---|---|---|
| | Conventional | This Invention | Conventional | This Invention |
| NaSCN | 150 | 210 | 0 | 0 |
| $Na_2S_2O_3$ | 30 | 25 | 0 | 0 |
| $Na_2SO_4$ | 70 | 15 | 90 | 20 |
| $Na_2CO_3$ | 20 | 20 | 160 | 230 |

Referring now to Tables 1 and 2, the amount of sulfate in liquor subject to conventional treatment is substantially higher than the amount of sulfate in liquor subject to treatment according to the invention. It is seen from the tables that this difference in sulfate content exists in both the spent liquor and the treated liquor; thus emphasizing that it is the conventional regeneration process exemplified by reactions (6), (7) and (8) that generates the sulfate, not the scrubbing and Stretford processes exemplified by reactions (1), (2), (3), and (4). Accordingly, whereas conventional reductive regeneration does not cause nearly complete decomposition of sulfate, and sulfate is present in the products produced by the reductive reactor, sulfate becomes a part of the Stretford liquor when the treated liquor is returned to the Stretford liquor stream. Thus is there a significant fraction of sulfate in the Stretford chemicals in both the purge stream and after the reduction process, as the Stretford chemicals are continuously recycled through the Stretford System in the scrubbing of industrial process gases, and regenerated by a conventional reductive burning process.

The process of the invention is capable of causing a large fraction of sodium sulfate to decompose in the reduction furnace, as in reaction (9). Therefore, there is not a large constituent of sulfate in the smelt produced according to the invention, and thus no large accumulation of sulfate from the reductive regeneration process. Significantly, sulfate which may be present in the liquor fed into the reduction furnace is decomposed, as according to reaction (9), whereby the process of the instant invention provides a means for reducing sulfate, as in a waste stream, to sulfide.

This process, for example, may be of value in the pulping industry as a means of treating black liquor. Black liquor is treated in a reduction burning process for the conversion of sodium sulfate to sodium sulfide, and the burning of the black liquor organic matter in order to generate process heat. While the reductive burning is known in the paper industry, there may be substantial benefit to be gained by the mixing, with black liquor, of a carbonaceous particulate fuel, such as coal or coke, to increase the overall efficiency of the process.

Another industry that generates sulfates and sulfites, which sulfates and sulfites may be reduced by the process of the invention, is the resorcinol industry.

Yet another industry which generates quantities of materials reducible by the process of the invention is the industry for manufacturing TNT explosives. The waste stream from that process includes sodium sulfate ($Na_2SO_4$), sodium sulfite ($Na_2SO_3$), sodium nitrate ($NaNO_3$), and sodium nitrite ($NaNO_2$).

Yet another industry which generates sulfates and sulfites, which may be reduced using a reductive burning process as disclosed herein, is the industry for generating electric power using magnetohydrodynamics (MHD) technology.

As in the process disclosed for the treatment of Stretford liquor, it is anticipated that these other processes, and other processes producing similar waste products, may be treated using the process of the invention (some to generate useful and saleable products), effectively reducing the amount and toxicity of waste streams.

In general, then, the invention comprises a process for controlling, or reducing, the level of oxidized anions, preferably oxidized sulfur compounds, or oxidized nitrogen compounds, in a reaction medium, preferably in a closed loop recirculating reaction system. The process comprises withdrawing a purge stream of less than all of the reaction medium, usually from the main liquor reservoir. The purge stream includes the oxidized anion compounds, from the reaction medium. The purge stream is introduced into a furnace operating witih reducing conditions. The oxidized anions are introduced into the furnace in such a way and in such a form that at least a portion of the anion compounds reaches a char bed at the base of the furnace. There, on the char bed, the oxidized anions react with a reducing agent and are reduced. The reduced compounds are recovered from the furnace, whereby they may be further utilized. In preferred embodiments, the recovered reduced chemicals are useful in the reaction medium from which the oxidized anion purge stream was withdrawn, and are returned to the reaction medium for use therein.

The purge stream in the Stretford process is preferably less than 10%, more preferably less than 5%, and is usually less than 1% of the overall flow rate of the reaction medium in the primary reaction system.

In other processes, the applicable purge stream may be a much higher fraction of the overall flow rate of the reaction medium, such as about 80% to 90% in the regeneration of block liquor in the pulping process. Others of the applicable industrial processes, and especially those which are free of lignin, may recycle an intermediate fraction of the stream of the reaction medium, such as 30% to 80%.

As referred to herein, a "valence unit" is defined as a unitary electrical charge on an ionic component of a compound. The valence of various anions is well known in the literature. A valence unit of reduction is the reduction of the valence number of an element such as sulfur by 1 numerical unit. For example, in sodium sulfate the sulfur atom exhibits a valence of +6. In sodium sulfide, sulfur exhibits a valence of −2. In transformation from the sulfate form to the sulfide form the valence has changed, then, from a +6 to −2, for a total change of 8 valence units.

"Percent by weight of solids," as used herein means the percent by weight of non-aqueous material. For example, in a pulping liquor, the "solids" would include the spent reaction chemicals, the organic lignin components, and the various short chain sugars which have been extracted from the wood in the pulping process. It will be appreciated that the terms "solids" as used here does include some liquidous materials which normally are not considered as solids; but for the invention disclosed herein they are to be considered solids for the purpose of defining the percent by weight of solids.

Having thus described the invention, what is claimed is:

1. A process for reducing anions in waste liquor, said process consisting essentially of the steps of: mixing a portion of a waste liquor purge stream containing anionic components with a carbonaceous material substantially free from lignin material into a mixture; intimately mingling the anionic material with the carbonaceous material of the stream; injecting the mixture as droplets into a furnace including a char bed and dropping the injected mixture droplets through the rising hot gases in the furnace; partially reducing the anions in the mixture and drying the mixture as the injected mixture falls through the furnace; incubating the fallen mixture on the char bed to further complete reduction of at least 75% of the anions of the mixture to reusable products while burning the carbonaceous material that forms the char bed with char to supply energy for the process.

2. A processing for reducing anions in waste liquor, said process consisting essentially of the steps of: intimately mingling a concentrated portion of a purge stream containing sodium thiosulfate with carbonaceous material free from lignin material to form a mixture; injecting the mixture and droplets into a furnace and thermally decomposing the sodium thiosulfate to a reaction product after water is evaporated from the mixture as the droplets fall through the furnace; incubating the mixture on a char bed to further complete reduction of at least 75% of the reaction products to reusable products; and melting the reusable product to a smelt and recovering the smelt from the char bed, the charred carbonaceous material that forms the char bed being oxidized to supply energy for the process.

* * * * *